United States Patent [19]

Green

[11] Patent Number: 4,934,059
[45] Date of Patent: Jun. 19, 1990

[54] GAUGING OF THREADS OF VARYING PITCH

[76] Inventor: William P. Green, 3570 E. Lombardy Rd., Pasadena, Calif. 91107

[21] Appl. No.: 312,227

[22] Filed: Feb. 21, 1989

[51] Int. Cl.$^5$ .............................................. G01B 3/36
[52] U.S. Cl. ..................................... 33/199 R; 33/545
[58] Field of Search ................. 33/199 R, 199 B, 829, 33/830, 545, 836, 838; 411/14

[56] References Cited

U.S. PATENT DOCUMENTS

| | | | |
|---|---|---|---|
| 1,714,780 | 5/1929 | Hartness | 33/199 R |
| 1,829,797 | 11/1931 | Hartness | 33/199 R |
| 1,875,872 | 9/1932 | Hoke | 33/199 R |
| 1,875,899 | 9/1932 | Thomson | 33/199 R |
| 1,877,307 | 9/1932 | Hartness | 33/199 R |
| 1,905,705 | 4/1933 | Hartness | 33/199 R |
| 2,412,781 | 12/1946 | Parr | 33/199 R |
| 2,556,564 | 6/1951 | Troedson | 33/199 R |
| 2,680,301 | 6/1954 | Steczynski | 33/199 R |
| 2,835,046 | 5/1958 | Gulyban | 33/199 R |
| 2,883,760 | 4/1959 | Eriksson | 33/199 R |
| 3,015,892 | 1/1962 | Stuart | 33/838 |
| 3,057,072 | 10/1962 | Kohlmeier | 33/199 R |
| 4,213,247 | 6/1980 | Romine | 33/199 R |
| 4,216,585 | 8/1980 | Hatter | 33/836 |
| 4,417,402 | 11/1983 | Hattan | 33/199 R |
| 4,519,144 | 5/1985 | Larsen | 33/199 R |
| 4,530,158 | 7/1985 | Chauquet | 33/199 R |

OTHER PUBLICATIONS

"The MTG System of Internal Gaging", published by MTG, Inc. in 1981, pp. 1 through 12.
"TRI-ROLL Thread Comparators and Thread Roll Snap Gages", published by Southern Gage Co., Jun. 1979, pp. 1 through 12.

*Primary Examiner*—William A. Cuchlinski, Jr.
*Assistant Examiner*—Christopher W. Fulton
*Attorney, Agent, or Firm*—William P. Green

[57] ABSTRACT

A gauge and gauging method for measuring a thread of varying pitch by screwing a threaded gauge element into engagement with the thread of varying pitch and to a point at which the threads have a light binding relationship resisting further advancement of the threads together. The device is constructed to then indicate the extent to which the gauge element has advanced when the binding condition is attained, and utilize that reading as a measurement of the functional accuracy of the thread of varying pitch. The device preferably includes a second element which, when the threads are in their lightly binding condition, is adjustable axially relative to the threaded gauge element and to a position of contact with the part containing the thread of varying pitch. Markings indicating the relative positioning of the two elements then provide a precise measurement of the functional accuracy of the thread of varying pitch. For initially calibrating the markings, some of the markings may be formed on a part which is rotatably adjustable to a zero setting or other reference setting.

31 Claims, 3 Drawing Sheets

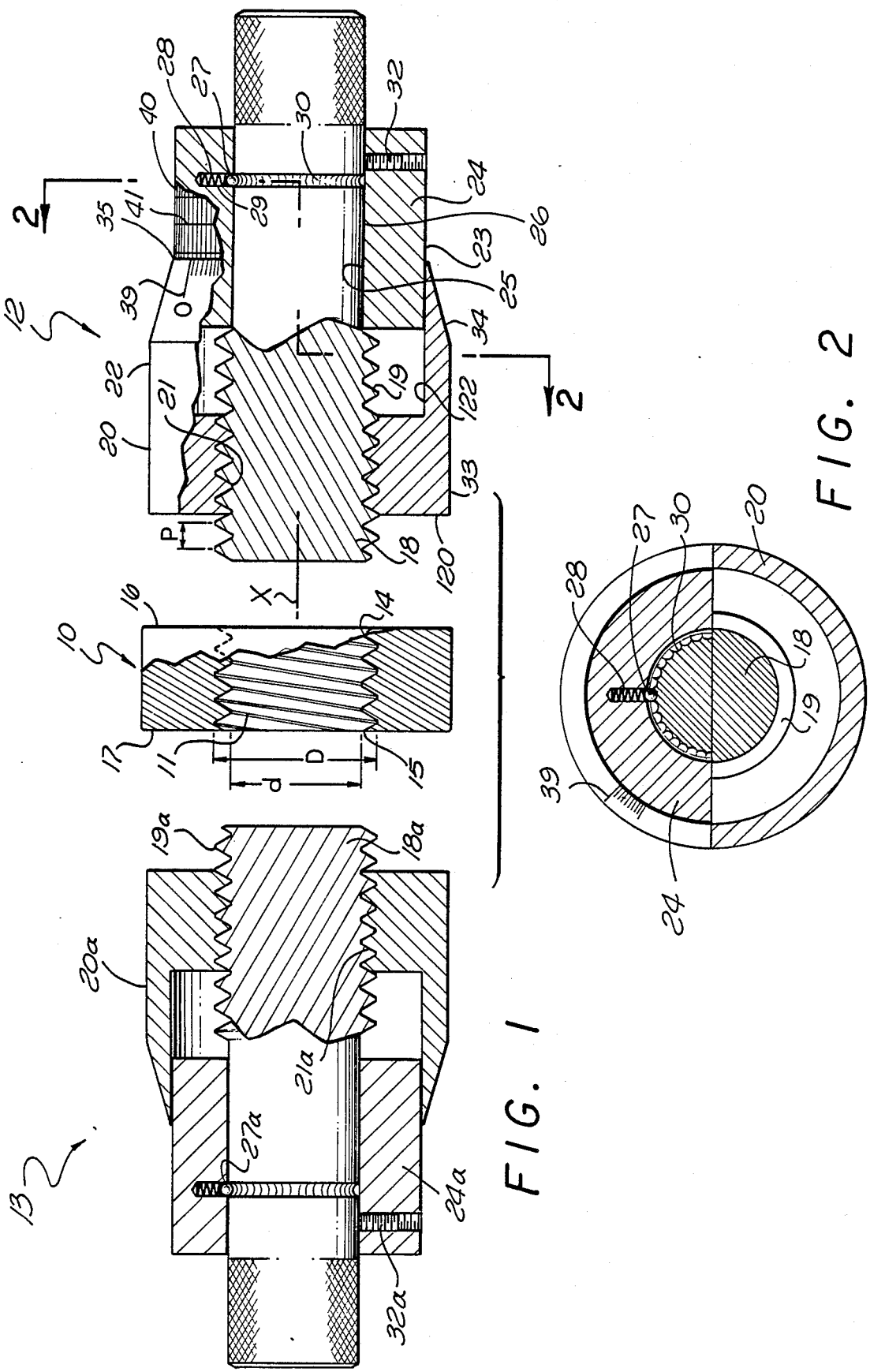

GAUGING OF THREADS OF VARYING PITCH

This invention relates to an improved gauge and gauging method for measuring threads of varying pitch.

BACKGROUND OF THE INVENTION

In some types of threaded fasteners, advantages can be attained by use of a thread whose pitch is not uniform but varies along the length of the fastener. For example, U.S. Patent Application Ser. No. 6/738,256 filed May 26, 1985 shows several different types of nuts having an internal thread whose pitch increases gradually and progressively and at a uniform rate from one end of the nut to its opposite end. Such a thread of increasing pitch, if accurately dimensioned, can improve the distribution of axial load forces between different turns of the thread when the fastener is in use, and can also provide a self-locking action. However, it is difficult from a practical standpoint to determine with conventional gauges whether a varying pitch thread is in fact accurately dimensioned. Gauges of the type normally employed in measuring standard threads of uniform pitch can not easily check the accuracy of a thread of varying pitch, and yet proper gauging of a thread in production is an absolute requirement for many purposes such as high performance applications in the aircraft industry.

SUMMARY OF THE INVENTION

The present invention provides a unique type of gauge especially designed and adapted for measuring the functional accuracy of a thread of varying pitch. The invention in its broadest aspects may be applied to measurement of either internal or external threads, but in certain more specific respects is especially effective and will be described primarily as employed for gauging internal threads.

Structurally, a gauge embodying the invention includes an element having a thread of preferably uniform pitch which is adapted to be screwed into engagement with the varying pitch thread until the threads reach a lightly binding condition. Measurement of the extent of advancement of the threaded gauge element before it reaches that binding condition then serves as an accurate indication of the precision of the varying pitch thread.

For measuring the advancement of the gauge element relative to the varying pitch thread, the device may include a second element which is mounted for axial adjusting movement relative to the gauge element and to a position in which further advancement is prevented by contact with a nut or other work part carrying the variable pitch thread. In that position, indicator markings associated with the two elements provide a reading which represents the relative axial positioning of the two elements and thereby constitutes an accurate indication as to whether the variable pitch thread is properly dimensioned. The indicator markings may be presettable to an initial calibrated zero condition, preferably by rotary adjustment of a calibrating part relative to one of the two discussed elements of the device.

BRIEF DESCRIPTION OF THE DRAWINGS

The above and other features and objects of the invention will be better understood from the following detailed description of the typical embodiments illustrated in the accompanying drawings, in which:

FIG. 1 is a view primarily in axial section showing two gauges for measuring an internal thread of varying pitch in a nut:

FIG. 2 is a transverse section taken on line 2—2 of FIG. 1;

Figure 3:
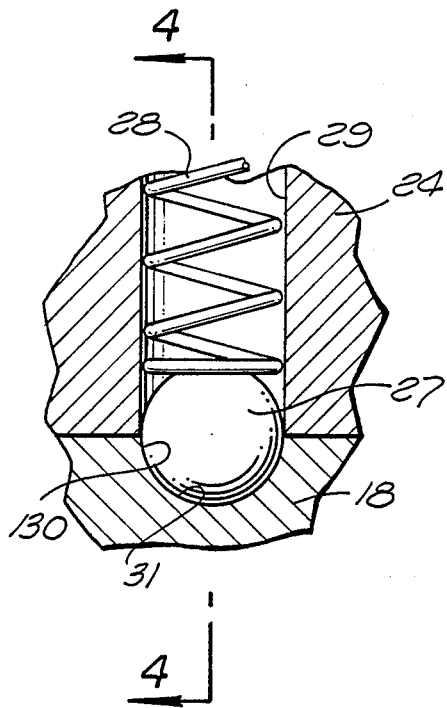
FIG. 3 is an enlarged fragmentary detail view taken in the plane of FIG. 2.

Referring first to FIG. 1, there is illustrated at 10 a nut whose internal thread 11 is to be checked for proper dimensioning by either one or both of two gauges 12 and 13 connectable into opposite ends of the thread 11. Preferably, both of the gauges are used to corroborate and supplement one another in the gauging process.

The internal thread 11 of the nut may be of the type disclosed in U.S. Patent Application Ser. No. 6/738,256, with the pitch of the thread increasing progressively and gradually from one of its ends to its opposite end. For example, in FIG. 1, it may be assumed that thread 11 has a pitch at its right end 14 corresponding to the pitch of an external thread of a screw with which the nut is to be utilized, and has a slightly greater pitch at its left end 15. The pitch of the thread 11 increases gradually and progressively at a uniform rate from the location 14 to the location 15. The major diameter D and the minor diameter d of thread 11 are also uniform along the entire axial extent of the thread. At the opposite ends of thread 11, nut 10 may have planar end faces 16 and 17 disposed perpendicular to the axis X of the nut and thread.

The gauge 12 for measuring the right end of the thread as seen in FIG. 1 includes an element 18 having a very accurately dimensioned and shaped external gauging thread 19 of uniform pitch, uniform major and minor diameters, and uniform thread profile in axial section. The pitch of thread 19 preferably corresponds to the pitch of thread 11 in nut 10 at the right end 14 of that nut. Thread 19 is thus adapted to be screwed into the right end of the nut thread 11 to a limited extent, but because of the varying pitch of the internal thread 11 element 18 and its thread 19 will ultimately bind in thread 11 and resist further advancement. The external thread 19 of element 18 may be slightly undersize with respect to thread 11, with both the major and minor diameters of the external thread 19 being slightly less than the major and minor diameters respectively of internal thread 11, to allow element 18 to be screwed into the internal thread 11 through a substantial distance. However, the relationship between the threads is such that they will reach a lightly binding condition before thread 19 has reached the left end 15 of thread 11. For example, the binding relationship may typically be attained in a position of the parts such as that represented in FIG. 5. The object of the gauge 12 is to measure how far element 18 can be screwed axially into nut 10 before binding occurs, and use this measurement as a determination of whether the internal thread of the nut is dimensioned properly.

Figure 4:
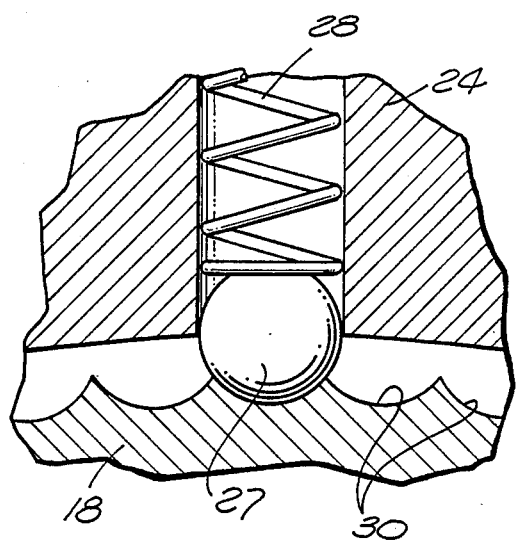
FIG. 4 is a fragmentary transverse section taken on line 4—4 of FIG. 3.

To assist in measuring the extent of advancement of element 18 into the nut, there is provided about the element 18 a member 20 having an internal thread 21 matching the external thread 19 on element 18 and allowing member 20 to be adjusted along axis X relative to element 18 by rotation of member 20. Thread 21 may have essentially the same uniform major and minor diameters, uniform pitch and uniform thread profile as thread 19. At its left end as seen in the FIG. 1, member 20 has an annular end face 120 which may be planar and disposed directly transversely of the axis X of nut 10, element 18 and member 20, and which is adapted to abut against end face 16 of the nut. An annular projection 22 on part 20 is centered about axis X and has an inner cylindrical surface 122 received in close proximity to the outer cylindrical surface 23 of an annular part 24 which has an inner cylindrical surface 25 engaging an outer cylindrical surface 26 on a portion of element 18. Part 24 is rotatably adjustable relative to element 18 about axis X, and is releasably retainable in any of different settings by a ball detent 27 urged radially inwardly by a spring 28 confined within a radial recess 29 in part 24. Ball 27 is receivable within any of a large number of closely circularly spaced detent notches 30 (FIG. 4) formed in the outer surface of element 18, to releasably retain element 24 in any desired rotary position relative to element 18. The notches 30 are formed in a shallow annular groove 31 in element 18 so that the spring pressed detent element will at all times project into that groove to be engageable with its opposite side walls 130 in a manner serving a secondary function of releasably retaining part 24 against axial movement relative to element 18 from the illustrated assembled position. A set screw 32 connected threadedly into part 24 may be tightenable against element 18 to lock part 24 more rigidly and more permanently in any fixed setting relative to element 18.

The radially outer surface 33 of member 20 may be cylindrical about axis X except near its right end where it may have a frustroconically tapering portion 34 centered about axis X and reducing at its extremity to a circular edge 35 centered about axis X and closely adjacent surface 23 of member 24. Parts 20 and 24 carry indicator markings which may include an index or zero mark 39 formed on tapering surface 34 of member 20 and a series of axially extending lines or marks 40 formed on surface 23 of part 24 at evenly circularly spaced locations. The successive markings 40 may typically be spaced one circular degree apart to provide 360 such markings appropriately numbered, about the periphery of part 24. Successive notches 30 in part 24 may also be spaced apart one circular degree to give a very precise rotary adjustment of the parts. Also, the setting of member 20 relative to part 24 may be further indicated by provision of a series of numbered circular lines 41 on part 24, intersecting lines 40 and centered about axis X, with successive lines 41 typically spaced apart an axial distance corresponding to the pitch P of threads 19 and 20. A particular setting of member 20 relative to part 24 can then be read by first noting which of the visible circular lines 41 is closest to edge 35 of part 20, and then noting which of the lines 40 is aligned with index marking 39 on member 20. Even greater precision may be attained if desired by providing part 20 with vernier markings 42 adjacent index marking 39 to enable the setting of the parts to be determined to tenths of a degree.

Figure 5:
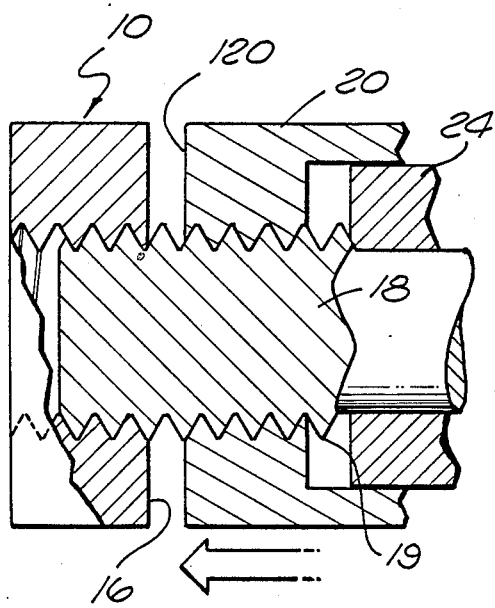
FIGS. 5 and 6 are fragmentary axial sectional views corresponding to a portion of FIG. 1, and showing two successive steps in the process of gauging an internal thread in a nut.
Figure 6:
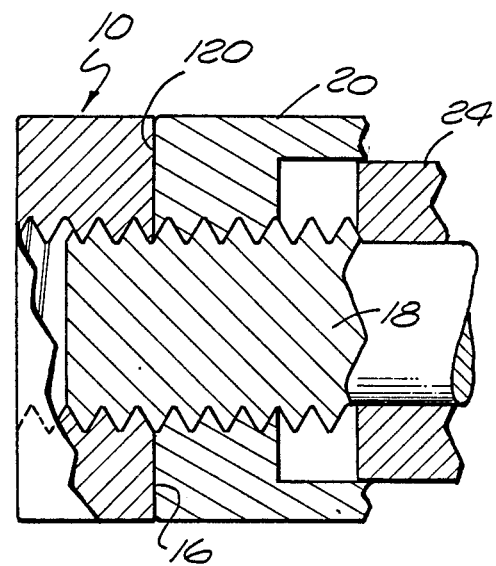

In using gauge 12, a person may initially grasp the preferably knurled or otherwise irregularized extremity 118 of element 18 and manipulate it in a manner manually screwing the external thread 19 at the left end of element 18 into the right end 14 of internal thread 11 of nut 10. The user turns element 18 until thread 19 has a light binding engagement with thread 11 because of the progressive increase in pitch of thread 11. Assume typically that the binding condition is attained in the FIG. 5 position of the parts. While holding element 18 in this lightly binding condition, the user turns member 20 about axis X relative to element 18 in a manner advancing member 20 to the left so that its end face 120 engages end surface 16 of the nut as represented in FIG. 6. The relative positioning of the markings on the outer surfaces of element 20 and 24 then indicates precisely the extent to which element 18 has been advanced into the nut before reaching the lightly binding condition. If the internal thread 11 of the nut is properly dimensioned, the markings on the parts 20 and 24 may indicate a predetermined zero reading, in which index marking 39 on element 20 is opposite a zero marking on part 24.

The capacity of part 24 for rotary adjustment relative to element 18 permits the device to be preset or calibrated to a desired zero setting. In calibrating the device, element 18 may be screwed into a gauge part having a precisely dimensioned internal reference thread of progressively increasing pitch corresponding exactly to that desired for the nut 10. FIGS. 5 and 6 may be considered as illustrating this calibrating process if it is assumed that during calibration the nut represented at 10 in FIGS. 5 and 6 is itself the gauge part having the precisely formed reference thread. In performing the calibrating procedure, element 18 is first screwed into the internally threaded gauge part to the lightly binding condition of FIG. 5, and member 20 is then rotated until it engages the end face 16 of the internally threaded gauge part (FIG. 6). After the parts 18 and 20 are in this condition, element 24 may be forceably rotated against the resistance of spring detent 27 and relative to element 18 to a condition in which the markings on parts 20 and 24 are at the desired zero setting calibrated condition. Part 24 is then retained permanently in that setting relative to element 18 by detent 27 while the gauge is utilized for measuring nuts whose threads are intended to correspond to the internal thread of the gauge part. If desired, part 24 may be more permanently locked in the calibrated condition by tightening of set screw 32.

The gauge 13 which is connectable into the left end of thread 11 includes three parts 18a, 20a and 24a, a spring pressed detent element 27a and a set screw 32a, all of which may be identical with the corresponding parts 18, 20, 24, 27 and 32 of the gauge 12 except with regard to the pitch of external thread 19a of element 18a and the corresponding pitch of internal thread 21a of part 20a. The pitch of these threads 19a and 21a of gauge 13 preferably corresponds to the pitch of internal thread 11 of nut 10 at the left end 15 of that internal thread, to facilitate initial advancement of element 18a into the nut. The major and minor diameters and axial sectional profile of threads 19a and 21a are uniform along the axial extents of these threads and are the same as the corresponding dimensions and profiles of the threads of gauge 12. Gauge 13 is used in essentially the same manner as gauge 12, with element 18a being first advanced threadedly into the left end of thread 11 of the nut, to a point at which there is a light binding engagement of the threads, after which part 20a is screwed rightwardly along element 18a into engagement with end face 17 of the nut, so that the rotary and axial setting of part 20a relative to part 24a can be read from the markings on these parts to indicate whether the internal thread of the nut is properly dimensioned.

The device and its use may of course be varied in many of different ways without departing from the concept of the invention. One possible variation in the manner of use of the device is to employ a single one of the gauges 12 or 13 for insertion into both ends of the nut. In that case, the external thread 19 of element 18 may if desired be given a pitch corresponding to the pitch of internal thread 11 of the nut at a location axially midway between the opposite end faces 16 and 17 of the nut in order to facilitate advancement of thread 19 into either end of the nut. Also, it may be helpful in some instances to make thread 19 slightly undersize with respect to thread 11. In using the single gauge at both ends of the nut, element 18 may first be screwed into the right end of the nut to a condition of light binding engagement with thread 11, after which member 20 is advanced into engagement with end face 16 as discussed to attain a gauge reading for the smaller pitch end of the nut thread, followed by insertion of the gauge assembly 12 into the opposite end of the nut to attain a gauge reading in the same way for that end of the nut. It is also contemplated that in some cases, as previously indicated, gauging of the nut from only one end may be adequate. Further, other means of measuring the extent of advancement of thread 19 or 19a into the internal thread of the nut may be provided in lieu of the discussed parts 20 and 24.

In some instances, it may be desirable to supplement the gauging measurements taken by the gauges 12 and/or 13 with other measurements of the nut 10 or thread 11 taken with other equipment. For example, it may be desirable to measure the minor diameter d and/or major diameter D of thread 11 by conventional gauges. Also, if the ends of the thread 11 are chamfered before the gauging process, it may be desirable to independently measure the dimensions and angularity of the chamfer, since inaccuracies in the chamfer may affect the position at which element 18 or 18a reaches a condition of light binding engagement with thread 11 when screwed thereinto.

If desired, the external thread 19 of element 18 may be given a small enough diameter to enable element 18 to be screwed into thread 11 through almost the entire axial extent of that thread before the condition of light binding engagement between threads 19 and 11 is attained, so that substantially the entire length of thread 11 can be checked with a single insertion of element 18 into the nut.

Figure 7:
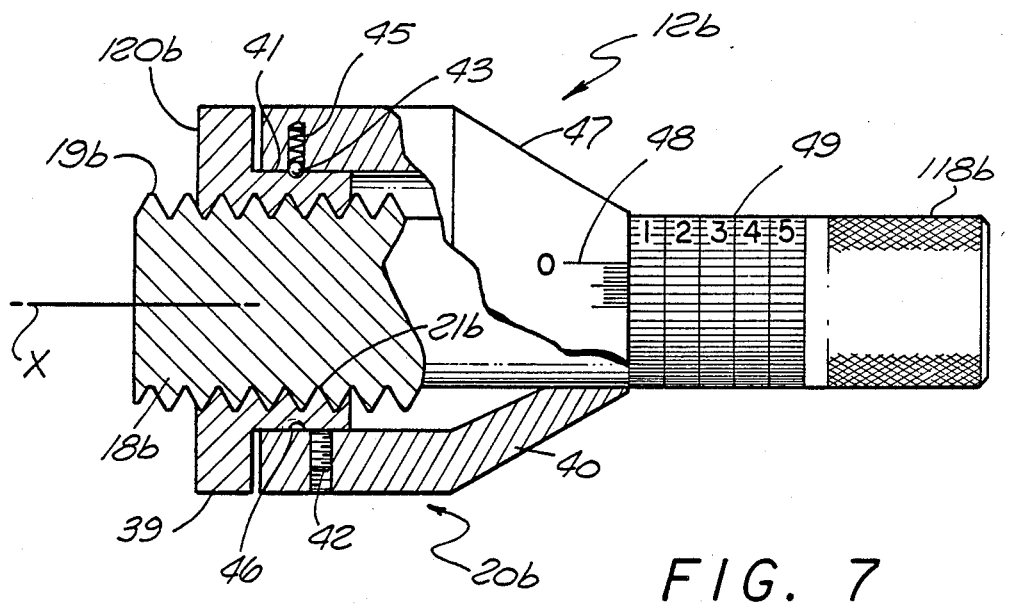
FIGS. 7 and 8 are axial sectional views (partly in elevation) of two variational types of gauges.

FIG. 7 shows a variational type of gauge 12b in which the zero setting calibration is attained in a somewhat different way. In FIG. 7, member 18b is similar to the part 18 of FIG. 1 and has an external thread 19b corresponding to thread 19 of the first form of the invention and adapted to be screwed into the varying pitch thread 11 of nut 10. An annular unit 20b of FIG. 7 is in some respects similar to member 20 of FIG. 1, but is formed sectionally of two parts 39 and 40, having engaging cylindrical surfaces at 41 centered about axis X of the gauge to enable rotation of part 40 relative to part 39 about that axis. Part 39 has an internal thread 21b corresponding to thread 21 of FIG. 1 and engaging thread 19b.

A set screw 42 is connected threadedly into part 40 and tightenable against the outer surface of part 39, to lock them in any desired relative rotary setting. Also, a ball detent 43 received within a recess in part 40 is yieldingly urged radially inwardly by a spring 45 into a groove 46 in part 39 containing detent notches corresponding to notches 30 of FIG. 4, to yieldingly retain part 40 in any desired rotary position relative to part 39, and to prevent relative axial movement of parts 39 and 40. A tapering annular surface 47 on part 40 has a marking or markings 48 coacting with and readable against markings 49 on the outer surface of element 18b, to indicate the relative rotary and axial setting of unit 20b relative to element 18b. Markings 48 and 49 may correspond to the markings on member 20 and part 24 of FIG. 1, or may be otherwise designed to indicate the relative setting of the parts.

In using the gauge 12b of FIG. 7, a person initially grasps the knurled right end 118b of element 18b and manipulates that element to screw its left end into a nut such as that shown at 10 in FIG. 1, and to a position of light binding engagement with the thread 11 of varying pitch. When that condition is reached, the user rotates unit 20b to advance it leftwardly along element 18b until its end surface 120b contacts the end face 16 of the nut, in which position a reading of the relative positioning of markings 48 and 49 is taken as a measurement of the accuracy or inaccuracy of the varying pitch thread 11. The device of FIG. 7 may be initially preset to a zero condition by utilizing it in the above discussed manner but in connection with a specially formed nut 10 having a reference thread of accurately known dimensions and shape, with part 40 of unit 20b being adjusted rotatably relative to part 39 while threads 19b and 11 are in light binding engagement and the end face 120 of part 39 is in contact with end surface 16 of the gauge part containing the reference thread. Part 40 is turned to a position relative to part 39 in which the markings are at a zero setting, so that any variation from that zero setting in measuring manufactured parts will indicate an inaccuracy.

Figure 8:
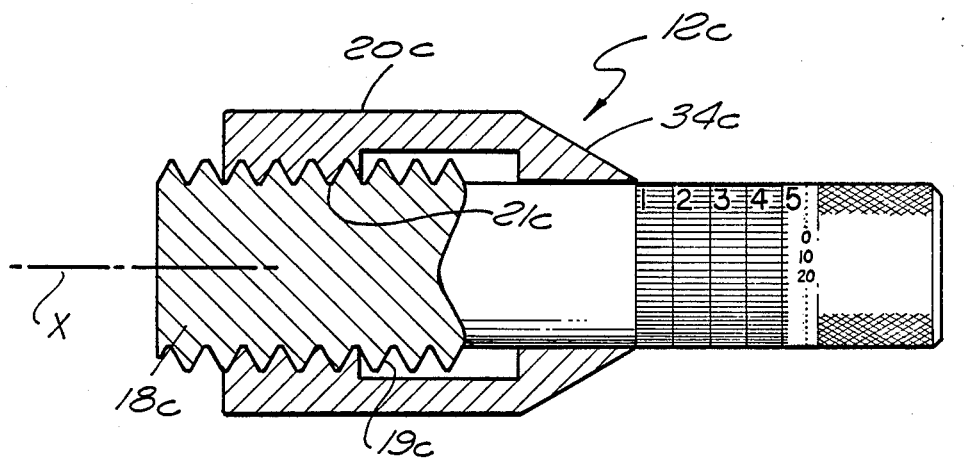

FIG. 8 illustrates a variational gauge 12c which is structurally simpler than the other forms but does not have a capacity for calibration to a zero setting. Gauge 12c includes an element 18c having an external thread 19c corresponding to thread 19 of FIG. 1 and adapted to be screwed into an internal thread being measured. An annular part 20c has an internal thread 21c engaging thread 19c. Markings on a tapered annular surface 34c of part 20c and on element 18c and typically corresponding to the markings 39, 40, 41 and 42 of FIG. 1, or to markings 48 and 49 of FIG. 7, indicate the relative rotary setting of parts 18c and 20c. In using gauge 12c, element 18c is screwed into the internal thread being measured as in the other forms of the invention until a light binding condition is attained, after which member 20c is advanced into engagement with the nut or other part containing the thread being measured, and the markings on elements 18c and 20c then give a reading which may be compared with a similar reading previously obtained with a reference thread.

In any of the various forms of the invention, it may be desirable in some instances to form the thread 19, 19a, 19b or 19c to have major, minor and pitch diameters equalling the smallest major, minor and pitch diameters respectively which are permissible for the manufactured part as determined by its tolerances. For example, if the tolerance for the pitch diameter of the manufactured nut being gauged is 0.73 inches to 0.77 inches, thread 19, 19a, 19b or 19c can be given a pitch diameter of 0.73 inches. Similarly, the major and minor diameter of thread 19, 19a, 19b or 19c can be given values at the lower end of their tolerance range. The element 18, 18a, 18b, or 18c when first screwed into a thread being checked will then function as a "go - no go" gauge. If element 18, 18a, 18b or 18c can not be screwed into the part, the thread of that part is undersize and should be rejected. If element 18, 18a, 18b or 18c can be screwed into the part, the user proceeds to utilize the gauge in the manner previously discussed to further determine the accuracy of the internal thread.

While certain specific embodiments of the present invention have been disclosed as typical, the invention is of course not limited to these particular forms, but rather is applicable broadly to all such variations as fall within the scope of the appended claims.

I claim:

1. A gauge for measuring a thread of varying pitch formed on a work part, said gauge comprising:
   an element having a thread of uniform pitch adapted to be screwed along an axis into engagement with said thread of varying pitch and to a position at which binding of the threads caused by their difference in pitch offers resistance to further advancement of the threads together; and
   means for indicating the position at which said binding of the threads caused by their difference in pitch occurs as a measurement of said thread of varying pitch.

2. A gauge as recited in claim 1, in which said thread of varying pitch is an internal thread, and said thread of said element is an external thread.

3. A gauge as recited in claim 1, in which said thread of said element is of uniform diameter, and uniform thread profile in axial section.

4. A gauge for measuring an internal thread of progressively increasing pitch formed in a work part, said gauge comprising:
   a first element having an external thread of uniform pitch adapted to be screwed along an axis into said thread of the work part and to a position at which binding of the threads offers resistance to their further advancement;
   a second element disposed about said first element and having an internal thread engaging said external thread of said first element to mount second element for threaded adjustment along said axis relative to said first element so that, when said threads of said first element and work part are in binding engagement, said second element is adjustable axially relative to said first element to a position of engagement with said work part blocking further advancement of the second element, and
   markings for then indicating the position of said second element relative to said first element as a measurement of said thread of the work part.

5. A gauge as recited in claim 4, including an additional part connected to one of said elements for axial and rotary movement therewith relative to the other element and mounted for rotary adjustment relative to said one element, and means for releasably retaining said additional part against rotary movement relative to said one element.

6. A gauge as recited in claim 5, in which said markings include first marking means carried by said additional part and coacting second marking means carried by said other element, one of said marking means including an index marking, the other of said marking means including a series of circularly spaced markings readable against said index marking to indicate the relative rotary setting of said additional part and said other element, and a plurality of circular lines for indicating the relative axial position of said additional part and said other element.

7. A gauge as recited in claim 4, including an adjustment for calibrating said markings to a desired setting when said threads of the work part and first element are in binding engagement and said second element is in said position of engagement with the work part blocking further advancement of the second element.

8. A gauge as recited in claim 4, including an additional part connected to one of said elements for axial and rotary movement therewith relative to the other element and mounted for rotary adjustment relative to said one element, spring pressed detent means for releasably retaining said additional part in any of different rotary positions relative to said one element, and a set screw for rigidly but releasably retaining said additional part in any of different rotary positions relative to said one element.

9. The method of measuring a thread of varying pitch in a work part that comprises:
   screwing an element having a gauging thread of uniform pitch into engagement with said thread of varying pitch and to a position at which binding of the threads caused by their difference in pitch offers resistance to further advancement of the threads together; and
   noting the position at which said binding of the threads caused by their difference in pitch occurs as a measurement of said thread of varying pitch.

10. The method as recited in claim 9, including screwing said element having said gauging thread into engagement with a precisely formed reference thread of varying pitch and to a binding position, noting the position at which binding with the reference thread caused by a difference in pitch occurs, and comparing the binding position attained with said work part to the binding position attained with said reference thread as a measurement of the accuracy of the work part thread.

11. The method as recited in claim 10, including calibrating indicator markings representing the position of said element to a predetermined index setting when said gauging thread is in binding contact with said reference thread.

12. The method of measuring a thread of varying pitch in a work part that comprises:
   screwing an element having a gauging thread into engagement with said thread of varying pitch and to a position at which binding of the threads offers resistance to their further advancement together;
   adjusting a second element axially relative to said first mentioned element and to a limit position in which further advancement is prevented by said work part; and
   then noting the relative axial positions of said elements as a measurement of said thread of varying pitch.

13. The method as recited in claim 12, including screwing said first mentioned element having said gauging thread into engagement with a precisely formed reference thread of varying pitch in a reference member and to a binding position, then adjusting said second element axially to a limit position in which further advancement is prevented by said reference member, then noting the relative axial positions of said elements, and comparing the relative axial positions of said elements when said first mentioned element is in binding engagement with said work part thread and said second element is in said limit position thereof with the relative axial positions of said elements when said first mentioned element is in binding engagement with said reference thread and said second element is in said limit position, as a measurement of the accuracy of the work part thread.

14. The method as recited in claim 13, including calibrating indicator markings representing the relative axial positions of said elements to a predetermined index setting when said gauging thread is in binding contact with said reference thread and said second element is in said limit position relative to said reference member.

15. A gauge for measuring a thread of varying pitch formed on a work part, said gauge comprising:
an element having a thread adapted to be screwed along an axis into engagement with said thread of varying pitch and to a position at which binding of the threads offers resistance to their further advancement; and
means for indicating the position at which binding of the threads occurs as a measurement of said thread of varying pitch;
said indicating means including a second element which, when said threads are in binding engagement, is movable axially relative to said first mentioned element and said thread thereof to a position limited by said work part, and means for then indicting the position of said second element relative to said first mentioned element as a measurement of said thread of the work part.

16. A gauge as recited in claim 15, in which said second element has a surface engageable axially against said work part to limit said movement of said second element relative to said work part.

17. A gauge for measuring a thread of varying pitch formed on a work part, said gauge comprising:
an element having a thread adapted to be screwed along an axis into engagement with said thread of varying pitch and to a position at which binding of the threads offers resistance to their further advancement; and
means for indicating the position at which binding of the threads occurs as a measurement of said thread of varying pitch;
said indicating means including a second element which, when said threads are in binding engagement, is movable axially relative to said first mentioned element and said thread thereof to a position limited by said work part, and markings carried by said elements for then indicating the position of said second element relative to said first mentioned element as a measurement of said thread of the work part.

18. A gauge for measuring a thread of varying pitch formed on a work part, said gauge comprising:
an element having a thread adapted to be screwed along an axis into engagement with said thread of varying pitch and to a position at which binding of the threads offers resistance to their further advancement; and
means for indicating the position at which binding of the threads occurs as a measurement of said thread of varying pitch;
said indicating means including a second element connected threadedly to said first mentioned element for relative adjusting movement, so that, when said threads of said first mentioned element and said work part are in binding engagement, said second element is adjustable axially relative to said first mentioned element to a position limited by said work part, and means for then indicating the position of said second element relative to said first mentioned element as a measurement of said thread of the work part.

19. A gauge for measuring a thread of varying pitch formed on a work part, said gauge comprising:
an element having a thread adapted to be screwed along an axis into engagement with said thread of varying pitch and to a position at which binding of the threads offers resistance to their further advancement; and
means for indicating the position at which binding of the threads occurs as a measurement of said thread of varying pitch;
said indicating means including a second element having a thread engaging said thread of said first mentioned element for relative adjusting movement, so that, when said threads of said first mentioned element and said work part are in binding engagement, said second element is adjustable axially relative to said first mentioned element to a position limited by said work part, and means for then indicating the position of said second element relative to said first mentioned element as a measurement of said thread of the work part.

20. A gauge for measuring a thread of varying pitch formed on a work part, said gauge comprising:
an element having a thread adapted to be screwed along an axis into engagement with said thread of varying pitch and to a position at which binding of the threads offers resistance to their further advancement; and
means for indicating the position at which binding of the threads occurs as a measurement of said thread of varying pitch;
said indicating means including a second element having a thread engaging said thread of said first mentioned element for relative adjusting movement, so that, when said threads of said first mentioned element and said work part are in binding engagement, said second element is adjustable axially relative to said first mentioned element to a position limited by said work part, and markings associated with said elements for then indicating the position of said second element relative to said first mentioned element as a measurement of said thread of the work part.

21. A gauge as recited in claim 20, in which said markings include first marking means carried by said first mentioned element and coacting second marking means carried by said second element, one of said marking means including an index marking, the other of said marking means including a series of circularly spaced markings readable against said index marking to indicate the relative rotary setting of the elements, and a plurality of circular lines for indicating the relative axial position of said elements.

22. A gauge for measuring a thread of varying pitch formed on a work part, said gauge comprising:
an element having a thread adapted to be screwed along an axis into engagement with said thread of varying pitch and to a position at which binding of the threads offers resistance to their further advancement; and means for indicating the position at which binding of the threads occurs as a measurement of said thread of varying pitch;

said indicating means including markings for indicating the position at which binding of the threads occurs, and an adjustment for calibrating said markings to a desired setting when said threads are in binding engagement.

23. A gauge for measuring a thread of varying pitch formed on a work part, said gauge comprising:

an element having a thread adapted to be screwed along an axis into engagement with said thread of varying pitch and to a position at which binding of the threads offers resistance to their further advancement; and means for indicating the position at which binding of the threads occurs as a measurement of said thread of varying pitch;

said indicating means including a second element which, when said threads are in binding engagement, is movable axially relative to said first mentioned element and said thread thereof to a position limited by said work part, markings associated with said elements and coacting to then indicate the position of said second element relative to said first mentioned element as a measurement of said thread of the work part, and means for calibrating said markings to a predetermined setting when said threads are in binding engagement and said movement of said second element is limited by said work part.

24. A gauge for measuring a thread of varying pitch formed on a work part, said gauge comprising:

an element having a thread adapted to be screwed along an axis into engagement with said thread of varying pitch and to a position at which binding of the threads offers resistance to their further advancement; and means for indicating the position at which binding of the threads occurs as a measurement of said thread of varying pitch;

said indicating means including a second element having a thread engaging said thread of said first mentioned element for relative adjusting movement, so that, when said threads of said first mentioned element and said work part are in binding engagement, said second element is adjustable axially relative to said first mentioned element to a position limited by said work part, markings associated with said elements and coacting to then indicate the position of said second element relative to said first mentioned element as a measurement of said thread of the work part, and means for calibrating said markings to a predetermined setting when said threads are in binding engagement and said movement of said second element is limited by said work part.

25. A gauge for measuring a thread of varying pitch formed on a work part, said gauge comprising:

an element having a thread adapted to be screwed along an axis into engagement with said thread of varying pitch and to a position at which binding of the threads offers resistance to their further advancement; and means for indicating the position at which binding of the threads occurs as a measurement of said thread of varying pitch;

said indicating means including a second element which, when said threads are in binding engagement, is movable axially relative to said first mentioned element and said thread thereof to a position limited by said work part, an additional part connected to one of said elements for movement therewith, markings on said additional part and the other of said elements for indicating the relative position of said elements as a measurement of said thread of the work part, and means for adjusting the position of said additional part relative to said one element to calibrate said markings.

26. A gauge for measuring a thread of varying pitch formed on a work part, said gauge comprising:

an element having a thread adapted to be screwed along an axis into engagement with said thread of varying pitch and to a position at which binding of the threads offers resistance to their further advancement; and means for indicating the position at which binding of the threads occurs as a measurement of said thread of varying pitch;

said indicating means including a second element connected threadedly to said first mentioned element for relative adjusting movement, so that, when said threads of said first mentioned element and said work part are in binding engagement, said second element is adjustable axially relative to said first mentioned element to a position limited by said work part, an additional part connected to one of said elements for movement therewith relative to the other element, markings on said additional part and the other of said elements for indicating the relative position of said elements as a measurement of said thread of the work part, and means mounting said additional part for rotary adjusting movement relative to said one element to calibrate said markings.

27. A gauge as recited in claim 26, in which said mounting means connect said additional part to said first mentioned element for axial and rotary movement therewith and rotary adjustment relative thereto.

28. A gauge as recited in claim 26, in which said mounting means connect said additional part to said second element for rotary adjustment relative thereto.

29. A gauge as recited in claim 26, including means for releasably retaining said additional part in any of different rotary settings relative to said one element.

30. A gauge as recited in claim 26, including spring pressed detent means for releasably retaining said additional part in any of different rotary settings relative to said one element.

31. A gauge as recited in claim 26, including set screw means for releasably retaining said additional part in any of different rotary settings relative to said one element.

* * * * *